April 25, 1950

J. F. MEADE 2,505,294

LEVELIZING RESILIENT MOUNTING OF
VEHICLE BODIES TO CHASIS FRAMES

Filed Nov. 29, 1946

INVENTOR
J. F. Meade
BY Robb & Robb
ATTORNEYS

April 25, 1950

J. F. MEADE 2,505,294

LEVELIZING RESILIENT MOUNTING OF
VEHICLE BODIES TO CHASIS FRAMES

Filed Nov. 29, 1946

INVENTOR
J. F. Meade
BY
Robb & Robb
ATTORNEYS

Patented Apr. 25, 1950

2,505,294

UNITED STATES PATENT OFFICE 2,505,294

LEVELIZING RESILIENT MOUNTING OF VEHICLE BODIES TO CHASSIS FRAMES

Joseph F. Meade, Hammondsport, N. Y., assignor to Mercury Aircraft Incorporated, Hammondsport, N. Y., a corporation Application November 29, 1946, Serial No. 713,139

7 Claims. (Cl. 296—35)

My present invention comprises a novel levelizing resilient mounting of vehicle bodies to the chassis frames of such vehicles and is especially adapted for use in the mounting of truck or bus bodies to chassis frames.

The primary object of my invention is to provide a novel resilient mounting of the body to the chassis frame whereby the body will be yieldably or floatingly supported upon the chassis frame, whereby the body is insulated from the chassis frame to substantially eliminate metal to metal contact therebetween and whereby the said resilient mounting may be utilized for leveling the body with respect to the frame to compensate for any irregularities in the construction of the body and frame when assembled in the completed vehicle.

In the accomplishment of the foregoing objective, my invention provides not only cushioning of the body with respect to the frame but insulation and levelizing functions as well whereby the shocks and noise incident to relative movement of the parts of the vehicle body and frame in use are substantially reduced and the riding qualities of the vehicle are greatly improved.

In general my invention contemplates the provision of a body of resilient material such as a block of rubber or the like interposed between the body and the chassis frame of the vehicle and substantially confined on all sides except one side which is that side which may contact with either the body or the chassis frame. My invention further contemplates the provision of means for compressing the body of resilient material in a horizontal direction between two of its confining sides whereby the resilient body is caused to flow in the vertical direction of its unconfined side whereby to cause movement of the vehicle body in a vertical direction with respect to the chassis frame.

Other objects, advantages and features of the invention will appear from the following detailed description taken in conjunction with the accompanying drawings in which.

Figure 1:
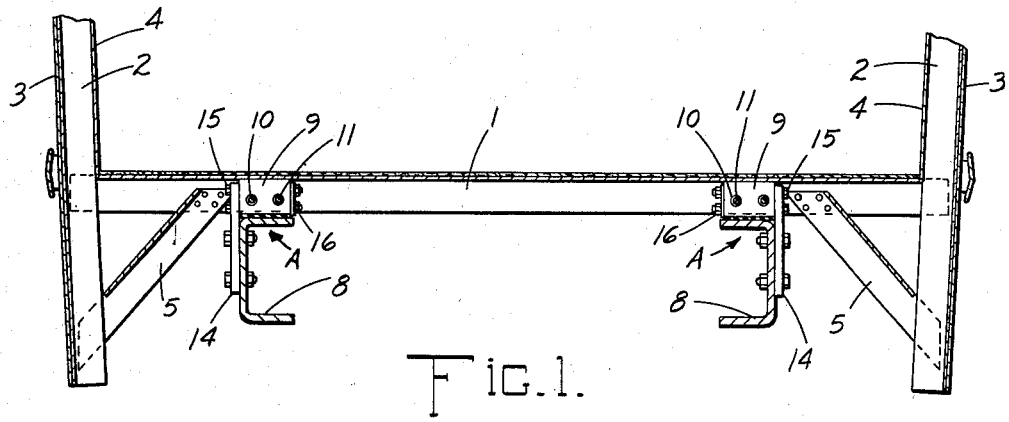
Figure 1 is a transverse vertical sectional view of body and chassis frame parts of a truck or like vehicle illustrating one application of my invention, the section being taken substantially on line 1—1 of Figure 5.

Now referring to the drawings for a detailed description of the invention there is illustrated in Figure 1 a portion of the body and chassis frame of a truck or like vehicle, the truck body consisting of a series of transverse crossbeams 1 of channel form, the opposite ends of which are secured to vertical posts to the outer sides of which is secured the sheet metal outer skin 3 of the body and to the inner sides of which posts 2 is secured the sheet metal inner skin 4 of the body. The posts 2 are rigidly braced to the crossbeams 1 by means of channel shaped braces 5. The plywood flooring 6 of the interior of the truck body is suitably secured to the crossbeams 1 by means of bolts 7.

The truck body, consisting of the parts already described, is mounted upon the longitudinal channel beams 8 of the vehicle chassis, which beams 8 extend longitudinally or lengthwise of the vehicle. The manner of mounting the body to the chassis frame 8 is best shown in Figures 2 to 5.

Figure 2:
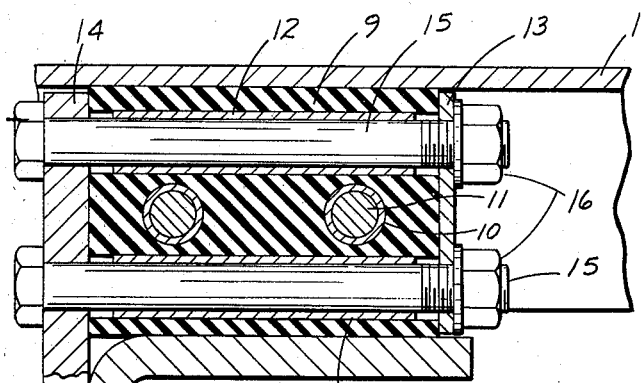
Figure 2 is a vertical sectional view taken through the mounting of the body and chassis frame parts showing the construction of my invention on an enlarged scale, and illustrating the condition of the elements as when the body of resilient material is in normal uncompressed condition, this view being an enlargement of the corresponding portion of Figure 4.
Figure 4:
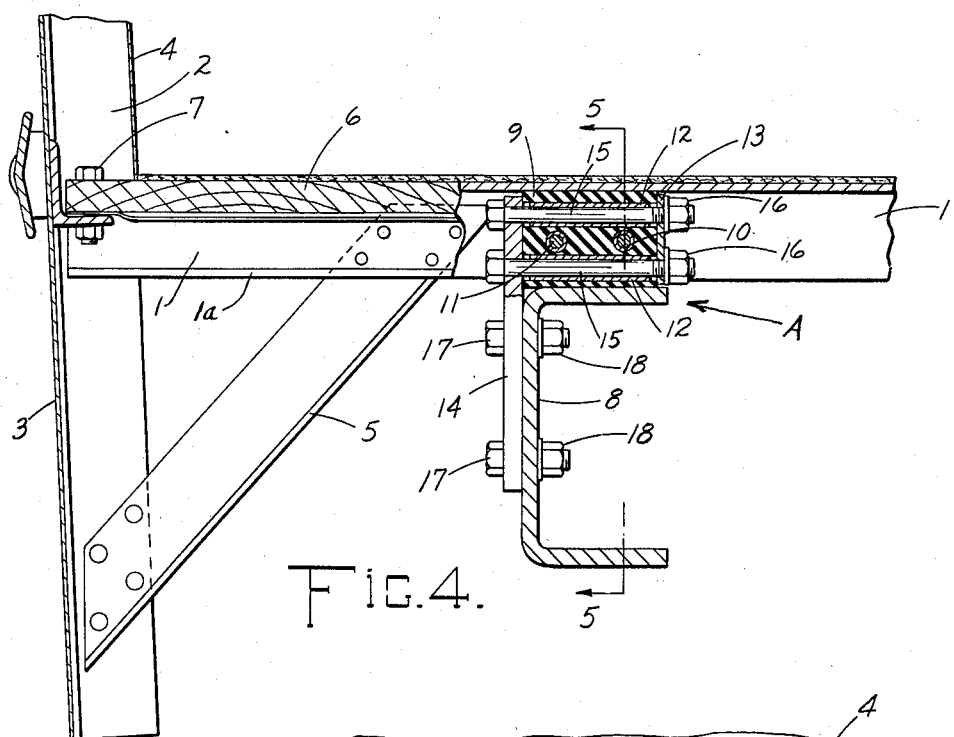
Figure 4 is an enlarged view of a portion of the structure shown in Figure 1, certain of the parts being shown in section, and other parts being shown in elevation.
Figure 5:
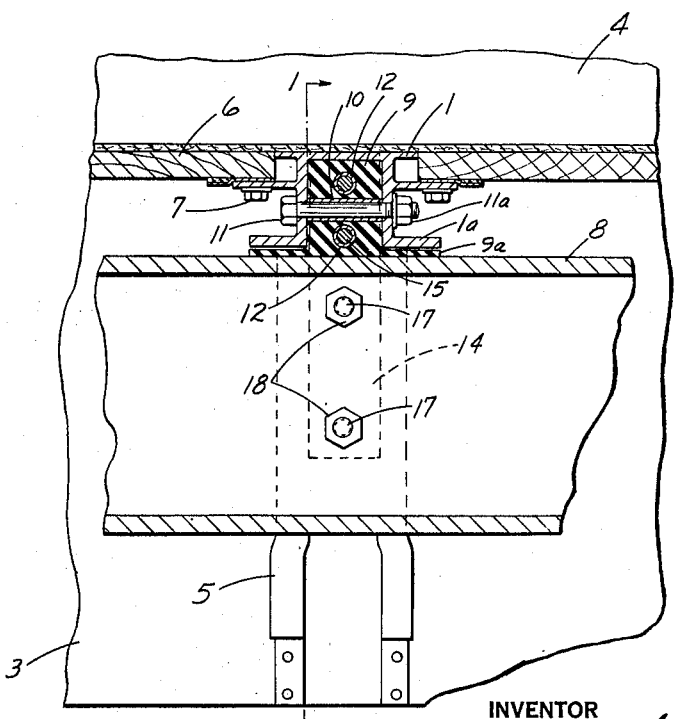
Figure 5 is a sectional view taken substantially on line 5—5 of Figure 4.

Referring now to Figure 5, wherein the formation of the crossbeams 1 is best shown, it will be noted that these crossbeams 1 are of channel shape, generally of U-shape in cross section and having the laterally extending flanges 1a. Within the channel portions of the crossbeams 1 is disposed a body of resilient material such as the block of rubber indicated by the numeral 9, which, when so disposed, is confined on three sides by the bottom and sides of the channel member 1, the rubber body 9 snugly fitting therein. Figures 2, 4 and 5 show clearly that in the normal uncompressed condition of the rubber block 9 it protrudes from the open side of the channel 1 and said rubber block 9 is provided throughout its length with the latterly extending portions 9a which lie between the flanged portions 1a of the channel 1 and the adjacent portion of the longitudinal channel beam 8 of the chassis.

The body of resilient material 9 is provided with transverse openings or passages extending transversely therethrough and in which are disposed suitable metal bushings 10 which are of the same length as the interior transverse width of the channel member 1 so that the ends of the bushings 10 are flush with the sides of the rubber block 9. Through the bushings 10 and through corresponding apertures in the sides of the channel 1 bolts 11 are adapted to extend for securing the rubber block in place in the channel 1. Other openings or passages extend through the rubber block 9 in a direction at right angles to the passages in which the bushings 10 are disposed. In these other openings or passages in the rubber block are disposed metal bushings 12 which are shorter than the corresponding dimension of the rubber block 9 as will appear most clearly from Figures 2, 3 and 4.

The ends of the rubber block 9 are confined between plates 13 and 14 which are secured in position by means of tensioning bolts 15 extending through suitable apertures in the plates 13 and 14 and through the bushings 12, the ends of the bolts 15 receiving nuts 16 which serve to secure the bolts 15 with the plates 13 and 14 in place on the rubber block 9.

From the foregoing description it will be seen that the mounting unit is comprised of the rubber block together with the plates 13 and 14 and the bolts 15 for securing the plates to the block, the said mounting unit being secured with the rubber block 9 disposed in the channel portion of the crossbeam 1 solely by means of the crossbolts 11 and the nuts 11a cooperating therewith.

In the employment of my invention for mounting vehicle bodies to chassis frames, the mounting unit is first secured to the crossbeam 1 with the rubber block 9 disposed in the channel thereof, by means of the crossbolts 11 and the nuts 11a securing the same in position. The body is mounted to the chassis frame in the manner indicated in the drawings and secured to the chassis frame solely by means of the bolts 17 passing through apertures in the plates 14 and in the longitudinal channel beams 8, the bolts 17 receiving the nuts 18 for securing the plates 14 to the longitudinal channel beam 8 of the chassis. When the body is assembled on the longitudinal channel beams 8 of the chassis frame in the manner indicated, the vehicle body will be supported upon the rubber block 9 with the portions 9a thereof interposed between the longitudinal channel beams 8 of the chassis and the flanged portions 1a of the crossbeams 1 of the body.

Upon the assembly of the body to the chassis frame as above described, the nuts 16 will be tightened up on the bolts 15 with the result of drawing the plate 13 toward the plate 14 thereby compressing the body of resilient material 9 therebetween. Since the body of resilient material 9 is confined on all sides substantially with the exception of the bottom or open side of the channel of the crossbeam 1, the aforesaid compression of the body of resilient material 9 will cause the same to flow substantially entirely in the vertical direction reacting against the longitudinal channel beam 8 of the chassis frame and the crossbeam 1 to effect a lifting or raising movement of the vehicle body in the vicinity of its suspension upon the body of resilient material 9. Since these mounting units each including a respective body of resilient material 9, these mounting units being generally designated by the letter A, are provided at various points of support of the vehicle body upon the longitudinal channel beams 8 of the chassis frame, by suitable adjustment of each of these mounting units A, accomplished by the extent of tightening of the nuts 16 upon the bolts 15, a levelizing of the vehicle body upon the chassis frame may be obtained.

By means of this levelizing adjustment carried out by the extent of compression of the respective rubber bodies 9 of the various mounting units A, the vehicle body may be levelized in spite of irregularities in the chassis frame and body parts. It will be apparent furthermore that a satisfactory cushioning of the body with respect to the chassis frame is obtained by the interposition of the bodies of rubber 9 between the chassis frame and vehicle body parts and that these rubber bodies serve to insulate the vehicle body parts from the chassis frame parts.

It may be noted that in the normal condition of the rubber body 9 before it is compressed and when it is disposed within the channel of the crossbeam 1, the upper end of the plate 14 preferably does not engage the bottom of the channel of the crossbeam 1. Also it may be noted that the plate 13 is of slightly less area than the corresponding cross-sectional area of the end of the rubber body 9 against which it engages. The plate member 14 is also preferably of slightly less width than the interior width of the channel between the sides thereof. This construction insures that the relatively movable metal parts forming part of or secured to the respective body, frame and chassis frame, are at all times substantially insulated as well as cushioned by the interposition of portions of the body of resilient material 9.

Figure 3:
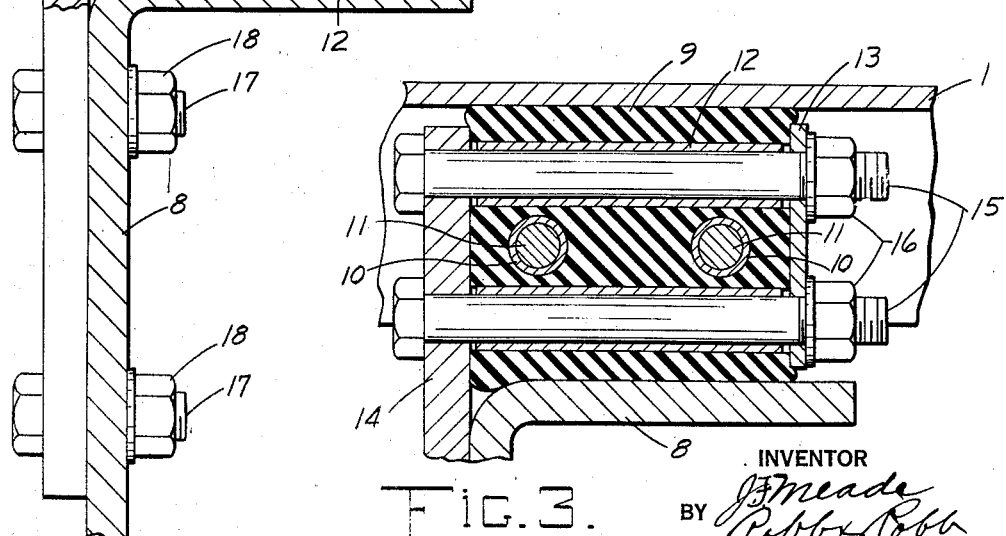
Figure 3 is a sectional view similar to Figure 2 but showing the condition of the parts when the body of resilient material has been compressed between two of its confining sides.

The action of compression of the resilient body 9 between plates 13 and 14, as a result of relative movement of said plates toward one another effected by tightening up of the nuts 16 on the bolts 15, is illustrated in Figure 3. Upon comparison with Figure 2, which illustrates the rubber block 9 in normal uncompressed condition, it will be seen that in Figure 3 the compression of the rubber block 9 between the plates 13 and 14 has caused said rubber block 9 to flow in the vertical direction thereby causing frame parts 1 and 8, between which rubber block 9 is interposed, to be forced apart or to move relatively away from one another.

Having thus described my invention, what I claim as new and desire to secure by Letters Patent of the United States is:

1. In vehicle construction, the combination of a body including a frame member of downwardly opening channel form, a chassis second frame member, a body of resilient material interposed between said frame members, said body of material seated in the channel portion of the first frame member and impinging said frame members at opposite sides of said body of material, means for confining said body of material between said frame members, and tensioning devices for compressing said body of material to enlarge its dimension vertically and cause relative vertical separating movement of said frame members.

2. In vehicle construction, the combination of a body frame member of downwardly opening channel form, a chassis frame member, a body of resilient material confined vertically between said frame members and disposed in the channel of the body frame member, said body of material impinging said respective frame members at the upper and lower sides of said body of material, members for confining said body of material horizontally between said frame members, adjustable members for compressing said body of material longitudinally of the channel portion of the body frame member to cause relative movement of said frame members away from one another, and means for securing the body of resilient material to at least one of said frame members.

3. A construction as claimed in claim 2, in which the body frame member is formed at its sides with outwardly extending flanges overlying the chassis frame member, the resilient body having extensions thereof lying between and confined by said flanges and the chassis body member.

4. In vehicle construction, the combination of a body including a frame member, a chassis including a frame member, a body of resilient material interposed between said frame members, said body of material impinging said frame members at opposite sides of said body of material, means for confining said body of material between said frame members, and means for compressing said body of material to cause relative movement of said frame members, one of the frame members being of channel form and the said resilient body being disposed between the sides of the channel, a pair of engaging elements engaging opposite ends of said resilient body and extending into said channel, one side of said resilient body protruding from the open side of said channel and impinging the other frame member, said means comprising instrumentalities associated with said engaging members and cooperative therewith to move said engaging members toward one another compressing said resilient body therebetween, one of said engaging members being secured to the other of said frame members.

5. In vehicle construction, the combination of a body including a frame member, a chassis including a frame member, a body of resilient material interposed between said frame members, said body of material impinging said frame members at opposite sides of said body of material, means for confining said body of material between said frame members, and means for compressing said body of material to cause relative movement of said frame members, one of the frame members being of channel formation and the said resilient body comprising a block of rubber disposed between the sides of the channel, a pair of plates engaging opposite ends of said rubber block and extending into the channel, one side of said rubber block protruding from the open side of the channel and impinging the other frame member, said means comprising instrumentalities associated with said plates and cooperative therewith to move said plates toward one another compressing said rubber block therebetween.

6. In vehicle construction, the combination of a body including a frame member, a chassis including a frame member, a body of resilient material interposed between said frame members, said body of material impinging said frame members at opposite sides of said body of material, means for confining said body of material between said frame members, and means for compressing said body of material to cause relative movement of said frame members, one of the frame members being of channel formation and the said resilient body comprising a rubber block disposed between the sides of said channel, a pair of plate members engaging opposite ends of said rubber block and extending into said channel, one side of said rubber block protruding from the open side of said channel and impinging the other frame member, said means comprising fastening elements associated with said plates and extending through the rubber block and adjustably cooperative with said plates to move the same toward one another compressing said rubber block therebetween.

7. In vehicle construction, the combination of a body including a frame member, a chassis including a frame member, a body of resilient material interposed between said frame members, said body of material impinging said frame members at opposite sides of said body of material, means for confining said body of material between said frame members, and means for compressing said body of material to cause relative movement of said frame members, one of the frame members being of channel formation and the said resilient body comprising a block of rubber disposed between the sides of the channel, a pair of plates engaging opposite ends of said rubber block and extending into the channel, one side of said rubber block protruding from the open side of the channel and impinging the other frame member, said means comprising instrumentalities associated with said plate and cooperative therewith to move said plates toward one another compressing said rubber block therebetween, one of said plates being secured to said other frame member, and means for securing said rubber block to the channel frame member.

JOSEPH F. MEADE.

REFERENCES CITED

The following references are of record in the file of this patent:

UNITED STATES PATENTS

| Number | Name | Date |
| --- | --- | --- |
| 1,727,609 | Kramer | Sept. 10, 1929 |
| 2,208,709 | Tjaarda | July 23, 1940 |
| 2,421,585 | Thiry | June 3, 1947 |

FOREIGN PATENTS

| Number | Country | Date |
| --- | --- | --- |
| 257,392 | Great Britain | Sept. 2, 1926 |
| 396,584 | Great Britain | Aug. 10, 1933 |
| 443,774 | Germany | May 6, 1927 |